UNITED STATES PATENT OFFICE.

FRANZ VON KUGELGEN AND GEORGE O. SEWARD, OF HOLCOMBS ROCK, VIRGINIA, ASSIGNORS, BY MESNE ASSIGNMENTS, TO TIN PRODUCTS COMPANY, OF NEW YORK, N. Y., A CORPORATION OF NEW YORK.

PROCESS OF DETINNING.

No. 915,029.     Specification of Letters Patent.     Patented March 9, 1909.

Application filed January 16, 1904. Serial No. 189,272.

*To all whom it may concern:*

Be it known that we, FRANZ VON KUGELGEN, a subject of the German Emperor, and GEORGE O. SEWARD, a citizen of the United States, both residing at Holcombs Rock, in the county of Bedford and State of Virginia, have jointly invented certain new and useful Improvements in Processes of Detinning, of which the following is a specification.

This invention aims to economically recover the tin from tin scrap.

The processes of detinning heretofore in use are subject to the disadvantages that they fail to recover all of the tin, and the tin which is recovered is accompanied by iron or other elements present in the scrap which are dissolved as impurities with the tin.

The present invention secures a complete detinning, and removes the tin without attacking the iron. It is based on the fact that dry chlorin at a suitably low temperature combines with tin, forming stannic chlorid but does not attack iron.

In practicing this invention the tin scrap is placed in any suitable vessel, and dry chlorin is introduced into contact with the scrap. The chlorin attacks the tin, forming stannic chlorid; the reaction is attended by active generation of heat, and care must be taken to control the temperature and keep it sufficiently low. A temperature at the walls of the vessel of below 100 degrees Fahrenheit (38 degrees C.) is preferable, but so long as the temperature does not rise so high as to make it impossible to hold the hand against the vessel, (say 140 degrees Fahrenheit,) the process can be successfully practiced. At these relatively low temperatures the iron is attacked only very slightly (about to the extent of its alloy with the tin of the coating) while practically all of the tin is converted into stannic chlorid. If the temperature rises too high, the underlying iron also is attacked, so that it is of great importance to prevent any serious rise of temperature. The temperature may be kept down either by cooling the vessel or by sufficiently limiting the amount of chlorin which enters the vessel. The temperature should be maintained high enough to secure a complete detinning.

As stannic chlorid ($SnCl_4$ is a liquid having a boiling point of 114 degrees Centigrade (237 degrees F.) it may be partly vaporized at the surface of the scrap by the heat of the reaction, but in such case it is retained within the vessel, being condensed on reaching cooler portions of the scrap or on the walls of the vessel. It may be collected by inclining the vessel to drain the liquid from the iron scrap which remains in the vessel. The tin chlorid is very pure, as the impurities of the iron either are not attacked, or if attacked by chlorin remain in the vessel, adhering to the iron, as the iron compounds (chiefly $FeCl_4$) do not form liquids like stannic chlorid, and are not soluble in $SnCl_4$.

The stannic chlorid may be variously utilized. In the form of a crystalline hydrated salt it is an important article of commerce. If desired, tin or any compound thereof may be recovered or formed from the stannic chlorid by any suitable or known treatment or reaction.

We claim as our invention:—

1. The recovery of tin from tin scrap by treating the latter in a closed vessel with dry chlorin to form stannic chlorid, maintaining the temperature sufficiently high to effect complete detinning and controlling the temperature to keep it below that at which the iron is attacked.

2. The recovery of tin from tin scrap by treating the latter in a closed vessel with dry chlorin to form stannic chlorid, and regulating the temperature by limiting the admission of chlorin, to keep the temperature below that at which the iron is attacked.

3. The recovery of tin from tin scrap by treating the latter in a closed vessel with dry chlorin to form stannic chlorid, heating internally by the heat of reaction to a temperature sufficiently high to effect complete detinning and controlling the temperature to keep it below that at which the iron is attacked.

4. The recovery of tin from tin scrap by treating the latter in a closed vessel with dry chlorin to form stannic chlorid, heating internally by the heat of reaction to a temperature sufficiently high to effect complete detinning and controlling the temperature by limiting the admission of chlorin and by cooling the vessel, to keep the temperature below that at which the iron is attacked.

5. The recovery of tin from tin scrap by treating the latter in a closed vessel with dry chlorin to form stannic chlorid, controlling the temperature to keep it high enough to effect complete detinning but low enough to prevent attacking the iron and to condense within the vessel such of the stannic chlorid as is vaporized, and draining the liquid stannic chlorid from the residue of iron scrap within the vessel.

In witness whereof, we have hereunto signed our names in the presence of two subscribing witnesses.

FRANZ VON KUGELGEN.
GEORGE O. SEWARD.

Witnesses:
GEO. T. LANCASTER,
JNO. B. HUFFARD.